United States Patent [19]

Ernst

[11] Patent Number: 4,495,700
[45] Date of Patent: Jan. 29, 1985

[54] APPARATUS FOR MEASURING THE ANGULAR DISPLACEMENT OF TWO OBJECTS RELATIVE TO EACH OTHER

[75] Inventor: Alfons Ernst, Traunreut, Fed. Rep. of Germany

[73] Assignee: Johannes Heidenhain GmbH, Traunreut, Fed. Rep. of Germany

[21] Appl. No.: 467,332

[22] Filed: Feb. 17, 1983

[30] Foreign Application Priority Data

Feb. 26, 1982 [DE] Fed. Rep. of Germany ....... 3206875
Jan. 15, 1983 [DE] Fed. Rep. of Germany ....... 3301205

[51] Int. Cl.$^3$ ............................................. G01B 11/26
[52] U.S. Cl. ...................................... 33/1 N; 33/1 L; 33/1 PT
[58] Field of Search .......... 33/1 N, 1 PT, 1 L, 125 C, 33/125 A; 250/231 SE

[56] References Cited

U.S. PATENT DOCUMENTS

| | | | |
|---|---|---|---|
| 2,465,497 | 3/1949 | Turrettini | 33/1 L |
| 4,075,478 | 2/1978 | Walker | 250/231 SE |
| 4,386,270 | 5/1983 | Ezekiel | 250/231 SE |

FOREIGN PATENT DOCUMENTS 2906432 8/1980 Fed. Rep. of Germany .

Primary Examiner—Harry N. Haroian
Attorney, Agent, or Firm—Willian Brinks Olds Hofer Gilson & Lione Ltd.

[57] ABSTRACT

An apparatus for measuring the angular displacement of two objects relative to each other. The apparatus includes a graduated plate which is attached to a rotatable shaft which is rigidly secured to a first object to be measured. The annular displacement of the graduated plate is measured by a scanning unit. The scanning unit and graduated plate are enclosed within a housing which is rigidly secured to a second object. The scanning unit is supported upon the rotatable shaft and secured by a coupling system to the housing so that it will not rotate with the shaft. The coupling system allows translational movements of the scanning unit with respect to the housing in planes perpendicular to the axis of the shaft without impairing the measurement accuracy of the scanning unit.

23 Claims, 6 Drawing Figures

APPARATUS FOR MEASURING THE ANGULAR DISPLACEMENT OF TWO OBJECTS RELATIVE TO EACH OTHER

BACKGROUND OF THE INVENTION

The invention relates to an improved coupling arrangement for a device for measuring the angular displacement of two objects rotating relative to each other, such as in a machine.

Devices for measuring the angular displacement of an object relative to another object are known in the art. Typically, such a device includes a rotatable shaft to which is attached a graduated plate. The rotatable shaft is secured by some means to a first rotating object. The angular displacement of the graduated plate is measured by a scanning unit which typically includes a photosensor which counts or scans the graduated plate as it passes through the scanning unit. Usually, the scanning unit and graduated plate are encased in a housing which is attached to a second object.

One such prior art device includes a rotatable shaft which is attached to a rotating object to be measured by a flexible coupling which is as torsionally rigid as possible. The housing is secured or clamped to a second object. Certain problems are presented with this type of measuring device. One problem is that the flexible coupling requires additional space outside the housing. Moreover, especially when a hollow rotatable shaft is used, it is difficult to construct a coupling between the rotatable shaft and the first rotating object that will transmit the angular displacement of the rotating object with the high degree of accuracy needed. Also, due to angular accelerations of the first rotating object, torsional vibrations are created which have an adverse effect on the position regulating circuit of a numerical control device for the machine.

Another prior art device for measuring the angular displacement of an object relative to another object utilizes a shaft which is rigidly attached to a rotating object. In this device, the housing is secured to the second object by a follower or articulated link which is as torsionally rigid as possible. A problem with this design is that due to the eccentricities of the shaft and of the shaft connection with the spindle, combined with the distance of the follower or the articulated link from the shaft axis angular errors which are not tolerable for precise measurements can be created. Moreover, forces acting on the housing from outside the device are conducted over the shaft bearing onto the shaft, and thereby effect the running precision of the bearing as well as the accuracy of the angular displacement measurement.

German Pat. No. 29 06 432 describes a coupling system for an apparatus for measuring the angular displacement of two objects relative to each other in which the shaft is rigidly secured to a first rotating object and the housing is coupled to a second stationary object over a parallel guide. In this type of coupling system there is a problem that forces from outside the apparatus are conducted onto the rotatable shaft and can result in an inaccurate measurement. These external forces can damage the coupling rods and their bending springs. Moreover, the coupling system utilized in this device requires an inordinate amount of space.

Thus, there is a need for a device for measuring the angular displacement of two objects relative to each other which overcomes the problems of the prior art.

SUMMARY OF THE INVENTION

The present invention is directed to an apparatus for measuring the angular displacement of two rotating objects relative to each other which overcomes the disadvantages of the prior art apparatus. The apparatus includes a rotatable shaft to which is attached a graduated plate. The rotatable shaft is rigidly secured to a first object. Journaled on the rotatable shaft is a scanning unit for measuring the angular displacement of the graduated plate. The scanning unit and graduated plate are enclosed in a housing which is rigidly secured to a second object.

The scanning unit is secured to the housing by a coupling system which prevents the scanning unit from twisting with respect to the housing. The coupling system allows for translational movements of the scanning unit with respect to the housing in planes perpendicular to the axis of the rotatable shaft in response to the eccentricities of the shaft without impairing the accuracy of the measurement.

In one preferred embodiment, the coupling system consists of an intermediate ring located concentric to the shaft and two sets of parallel guides located perpendicular to each other. In this embodiment these guides can consist of a pair of leaf springs and a pair of wire springs.

In another preferred embodiment, the coupling system consists of an intermediate ring and two sets of membrane springs.

In a further preferred embodiment, the coupling system consists of a bellows-type coupler.

Accordingly, an advantage of the present invention is to provide an apparatus for accurately measuring the angular displacement of two objects rotating relative to each other.

A further advantage of the present invention is to provide a coupling system which secures the scanning unit so that it will move in response to the eccentricities of the shaft but will not twist with respect to the housing.

An additional advantage of the present invention is that the coupling system requires no additional space outside of the housing.

Another advantage of the present invention is that the scanning unit may be journaled to the rotatable shaft and secured to the apparatus housing so it will not twist.

An additional advantage of the present invention is to provide a coupling system for securing the scanning unit that allows translational movements of the scanning unit with respect to the housing in planes perpendicular to the axis of the shaft but does not allow the scanning unit to twist.

A further advantage of the present invention is that the graduated plate and coupling system are protected by a housing from outside forces.

Additional features and advantages are described in, and will be apparent from, the detailed description of the preferred embodiments and from the drawings.

DETAILED DESCRIPTION OF THE PRESENTLY PREFERRED EMBODIMENTS OF THE INVENTION

Figure 1:
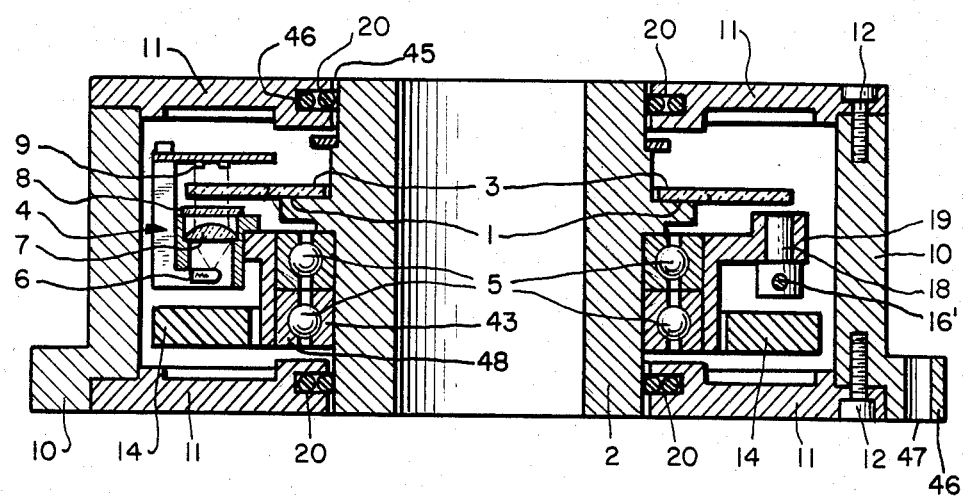
FIG. 1 illustrates a cross-sectional view of a first preferred embodiment of the apparatus for measuring the angular displacement of two objects taken along lines 1—1 in FIG. 3.
Figure 2:
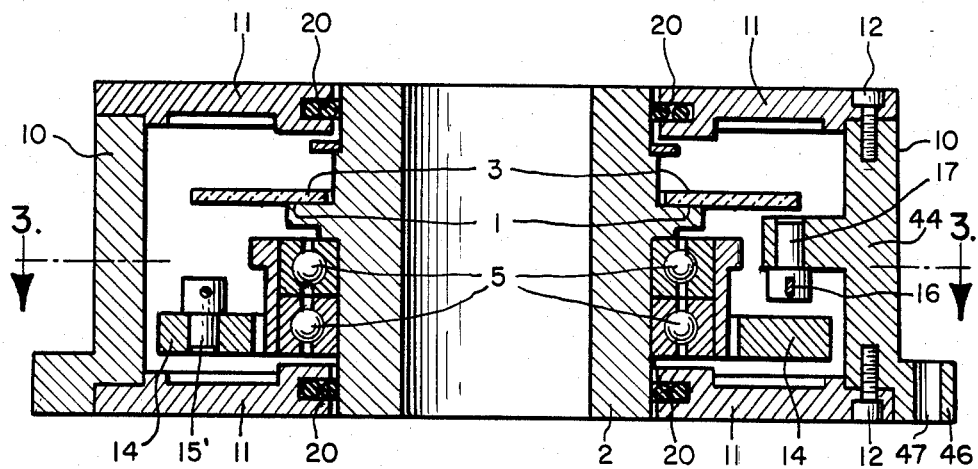
FIG. 2 illustrates a cross-sectional view of the first preferred embodiment along lines 2—2 of FIG. 3.
Figure 3:
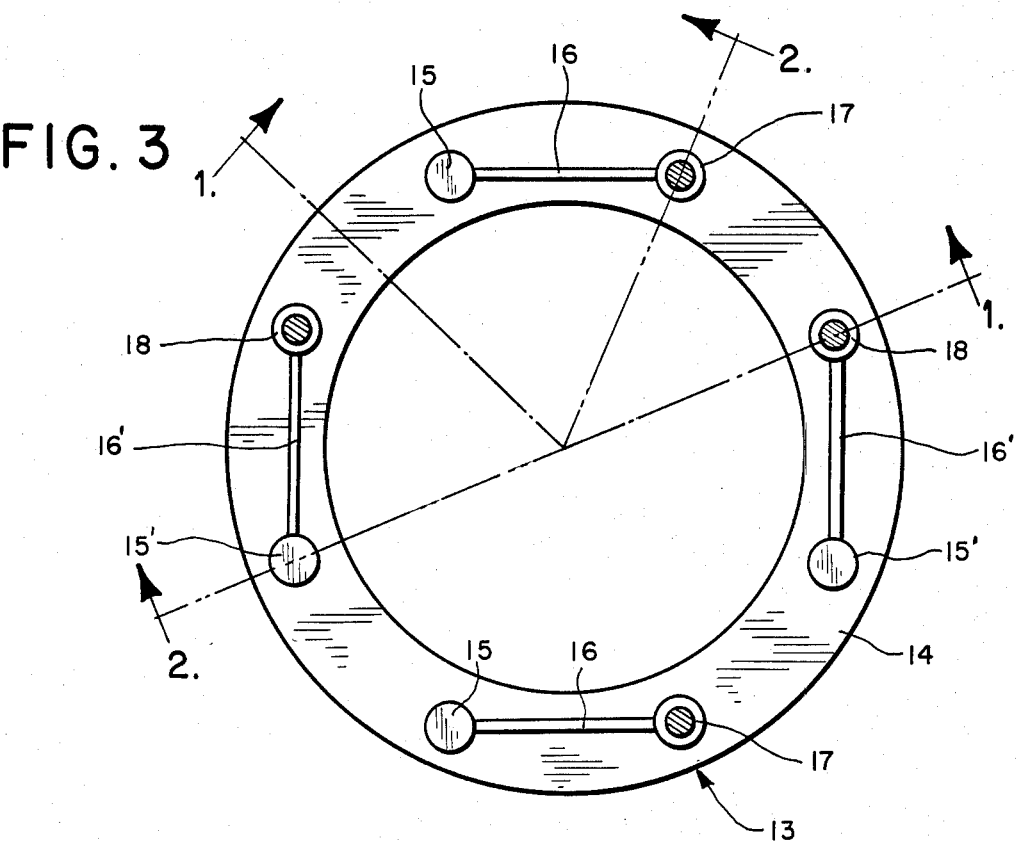
FIG. 3 illustrates a plan view of the first prefered embodiment taken along section lines 3—3 of FIG. 2.

Referring now to the drawings, FIGS. 1-3 illustrate a first preferred embodiment of the apparatus for measuring the angular displacement of two objects rotatable relative to each other of the present invention. The apparatus includes a rotatable shaft 2 which includes a bearing surface 1 to which is attached a graduated plate 3 by cement on some other means known in the art. The rotatable shaft 2 is rigidly secured to the rotating object to be measured. The graduated plate 3 is provided with a grid scale arranged such that the angular displacement of the rotatable shaft 2 and thereby the rotating object (not shown) to which it is secured may be measured by a scanning unit 4.

Journaled to the rotatable shaft 2 is a carrier ring 19 which supports the photoelectric scanning unit 4. The photoelectric scanning unit 4 includes a lamp 6, a condensor 7, a scanning plate 8 and photoelements 9. The scanning unit 4 is located so that as the rotatable shaft 2 turns the graduated plate 3 passes between the photoelements 9 and scanning plate 8. This allows the scanning unit 4 to monitor the angular displacement of the graduated plate 3 with respect to the scanning unit 4.

The carrier ring 19 is attached to a ball bearing 5. The ball bearing 5 includes an inner race 43 and an outer race 48 to which the carrier ring 19 is attached. This arrangement allows the scanning unit 4 to be supported on and adjust to the eccentricities of the rotating shaft 2 while at the same time allowing the scanning unit 4 to measure the angular displacement of the graduated plate 3.

The graduated plate 3 and scanning unit 4 are enclosed within a housing 10. The housing 10 includes a sidewall 44 and covers 11. The covers 11 are attached to the sidewall 44 by screws 12 and include an aperture 45 through which the shaft 2 may extend when the covers 11 are secured to the sidewall 44. The covers 11 also include a slotted portion 46 which circumscribes the aperture 45. The slot 46 is designed to receive elastic sealing elements 20 which prevent contaminants from entering the housing 10 between the shaft 2 and the covers 11 when the covers are secured to the sidewall 44. Moreover, the elastic sealing elements 20 are constructed so that relative movements between the rotatable shaft 2 and the housing 10 due to the shaft's eccentricities and angular alignment errors are elasticly compensated for.

The sidewall 44 includes a lip portion 46 which includes apertures 47. The apertures 47 allow the housing 10 to be rigidly secured to a second object (not shown).

Referring now to FIG. 3, the coupling system 13 for securing the scanning unit 4 to the housing 10 so that the scanning unit 4 will not twist with respect to the housing 10 but will remain flexible enough to move in response to the eccentricities of the shaft 2 is illustrated. The coupling system 13 includes an intermediate ring 14 located concentric to the carrier ring 19 and two sets of parallel guide springs 16 and 16' located perpendicular to each other.

One set of guide springs 16 are leaf springs oriented so that they are parallel to the plane of the intermediate ring 14 and are in a plane perpendicular to the axis of the rotatable shaft 2. To this end, one end of each leaf spring 16 is connected to a bolt 17 which is secured to a portion of the housing 10, and the other end of each leaf spring 16 is secured to a bolt 15 which is attached to the intermediate ring 14.

The other set of parallel guides consist of two spring wires 16' which are likewise located parallel to the plane of the intermediate ring 14 and are also in a plane perpendicular to the axis of the rotatable shaft 2. To this end, one end of the each spring wire 16' is attached to the carrier ring 19 by a bolt 18 and a second end of each wire 16' is attached to the intermediate ring 14 by a bolt 15'. Thus, the carrier ring 14, and thereby the scanning unit 4, are attached to the housing 10 and therefore secured to the second object.

The two sets of parallel guide springs 16 and 16' act perpendicularly to each other preventing the scanning unit 4 from twisting. To this end, the coupling system 13 permits translational movements perpendicular to one another of the scanning unit 4 with respect to the housing 10 in a plane perpendicular to the axis of the rotational shaft 2 in response to the eccentricities of the shaft 2 without impairing the measuring accuracy of the scanning unit 4.

Figure 5:
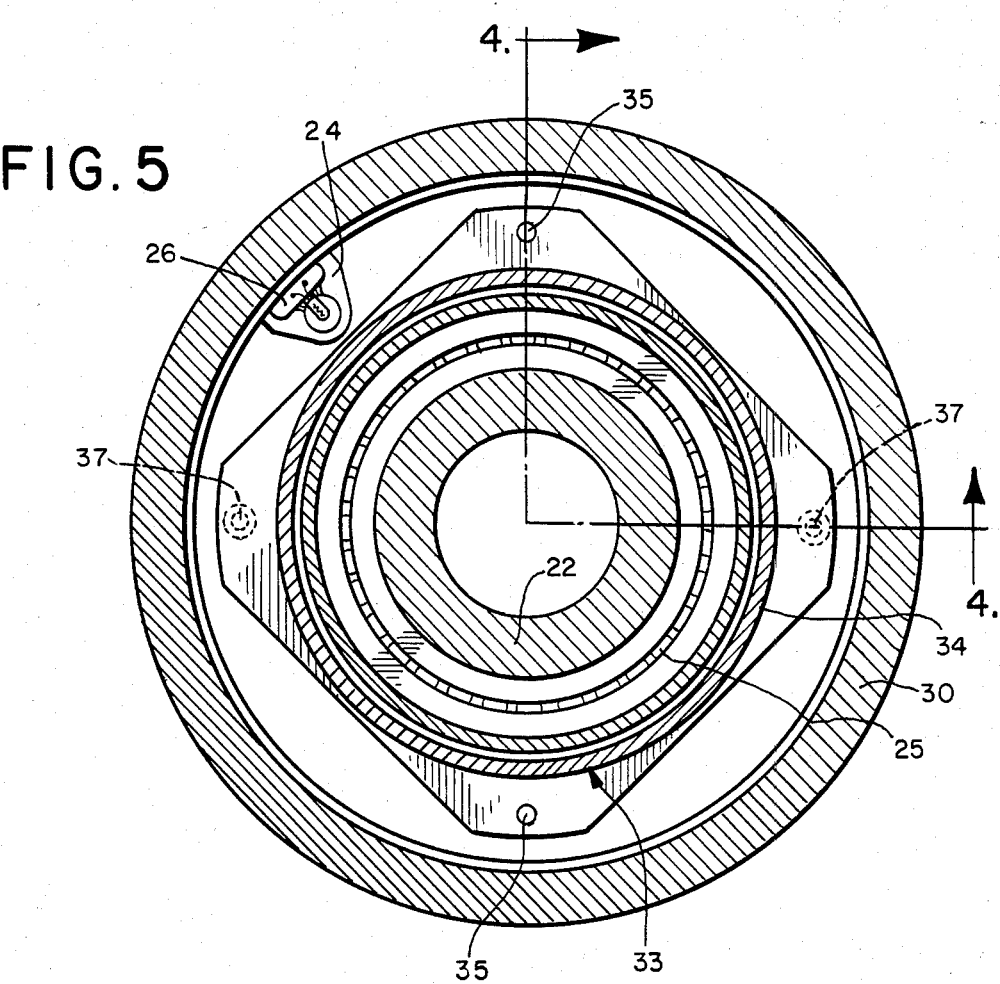
FIG. 5 illustrates a cross-sectional view of the second preferred embodiment taken along lines 5—5 of FIG. 4.
Figure 4:
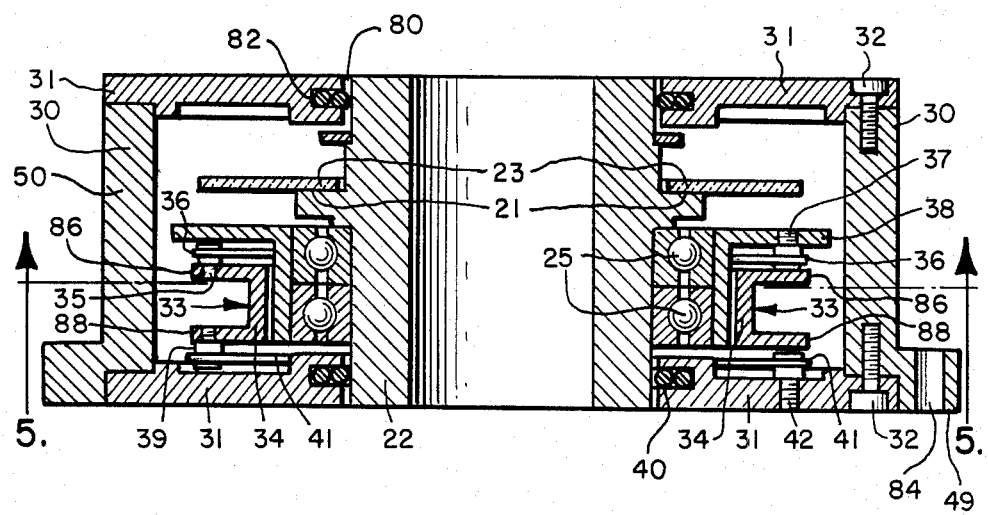
FIG. 4 illustrates a cross-sectional plan view of a second preferred embodiment of the apparatus for measuring the angular displacement of two objects taken along lines 4—4 of FIG. 5.

A second embodiment of the apparatus for measuring the angular displacement of two objects relative to each other is illustrated in FIGS. 4 and 5. This embodiment includes a bearing surface 21 on a rotatable shaft 22 to which is attached a graduated plate 23. The rotatable shaft 22 is rigidly secured to a first object (not shown) to be measured. A photoelectric scanning unit 24 which includes a lamp 26, a condensor, a scanning plate and photoelectric elements (not shown) is supported by a carrier ring 38 which is journaled to the rotatable shaft 22, by means of a ball bearing 25. Thus, the scanning unit 24 remains concentric with the rotatable shaft 22 but will not rotate with respect to the housing 30.

A housing 30 is located around the graduated plate 23 and scanning unit 24. The housing 30 includes covers 31 and a sidewall 50. The covers 31 are secured to the sidewall 50 by screws 32. The sidewall 50 includes a lip 49 which includes apertures 84 which allow the housing 30 to be rigidly secured to a second object (not shown) so that when the rotatable shaft 22 is attached to the first rotating object (not shown) the angular displacement of the graduated plate 23 with respect to the second object may be measured by the scanning unit 24. The covers 21 include an aperture 80 which allows the shaft 22 to extend through the covers when they are secured to the sidewall 50. The covers 21 further include a slotted portion 82 which circumscribes the aperture 80. The slotted portion 82 is constructed so that it receives sealing elements 40 which prevent contaminants from entering the housing 30 and are constructed in such a way that the relative movements of the rotatable shaft 22 and housing 30 due to the eccentricities of the shaft 22 and angle alignment errors are elasticly compensated for.

To secure the scanning unit 24 so that it is will not twist a coupling system 33 is provided. The coupling system 33 secures the scanning unit 24 to the housing 30 and consists of an intermediate ring 34 located concentric to the rotatable shaft 22, and two diaphragm springs or membrane springs 36 and 41. The intermediate ring 34 is spool shaped and includes an upper rim 86 and lower rim 88. One membrane spring 36 is attached at two locations to the upper rim 86 of the intermediate ring 34 by two diametrically opposed bolts 35. The membrane spring 36 is also attached at two separate locations to the scanning unit carrier ring 38 by bolts 37. Bolts 37 are located approximately 90° to the diametrically opposed bolts 35 on the intermediate ring 34.

The second membrane spring 41 is attached at two locations to the lower rim 86 of the intermediate ring 34 by two diametrically opposed bolts 39. The second membrane spring is also attached at two separate locations to the cover 31 of the housing 30 by bolts 42. Bolts 42 are located approximately 90° to the bolts 39 on the intermediate ring 34. When so attached, the membrane springs 38 and 41 are located in planes parallel to each other.

The coupling system 33 allows the scanning unit 34 to wobble with the shaft 32 but prevents the scanning unit 34 from twisting. To this end, the coupling system 33 allows translational movements perpendicular to one another of the scanning unit 4 with respect to the housing 30 and in planes perpendicular to the axis of the turnable shaft 32 in response to the eccentricities or angle alignment errors of the shaft 22 and first turnable object without impairing the measuring accuracy of the scanning unit.

Figure 6:
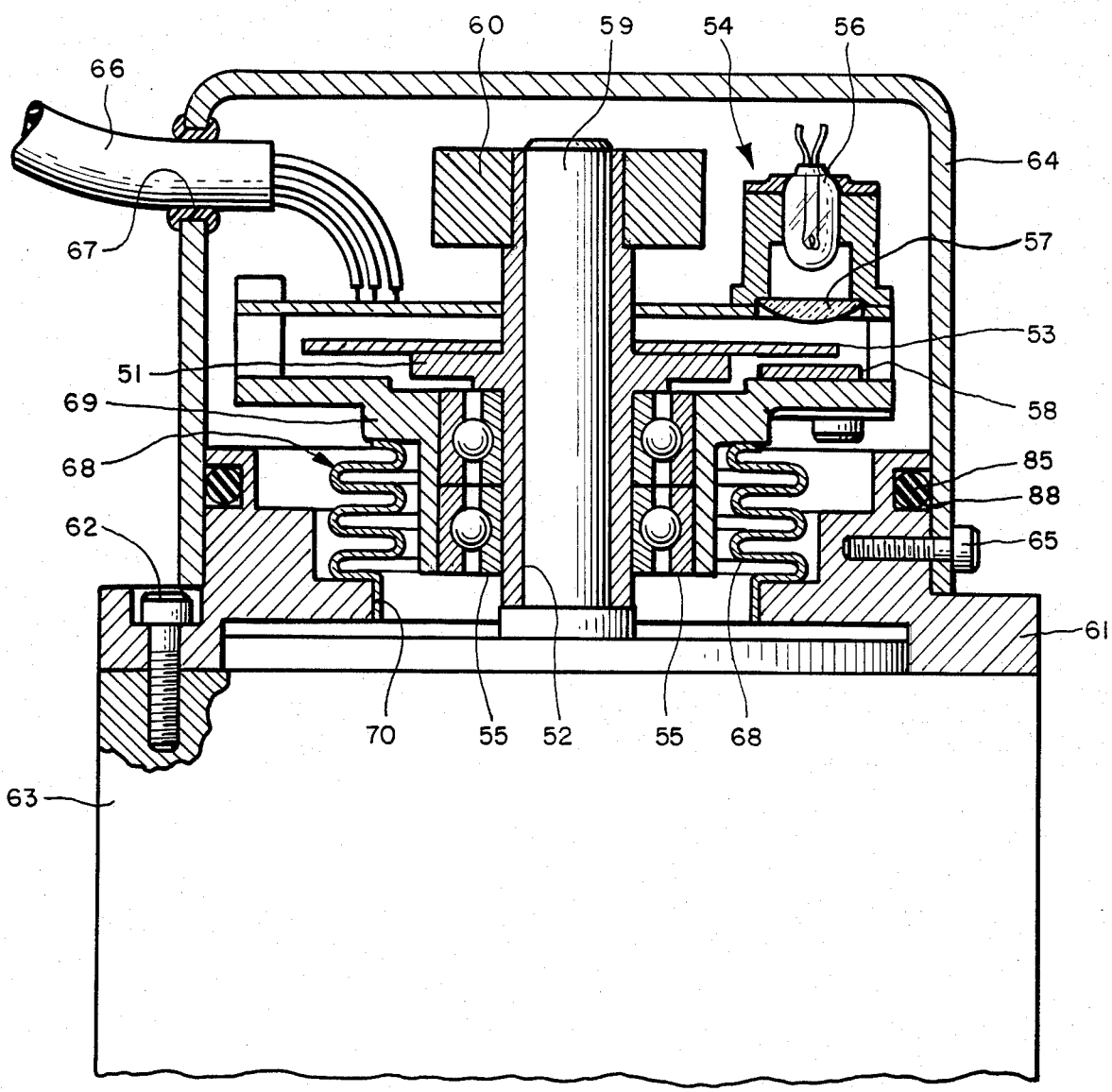
FIG. 6 illustrates a cross-sectional view of a third preferred embodiment of the apparatus for measuring the angular displacement of two objects relative to each other.

FIG. 6 illustrates a third preferred embodiment of an apparatus for measuring the angular displacement of two objects rotatable relative to each other. The apparatus includes a hollow turnable shaft 52 to which is connected at a bearing surface 51, a graduated plate 53. The graduated plate 53 is provided with a grid scale arranged such that the angular displacement of the rotatable shaft 52 may be measured by a photoelectric scanning unit 54. The photoelectric scanning unit 54 is supported by a carrier 69 which is journaled on the turnable shaft 52 by a ball bearing 55. The scanning unit 54 includes a lamp 56, a condenser 57, a scanning plate 58 and photoelements (not shown).

The rotatable hollow shaft 52 is constructed so that it may receive a spindle 59 of a rotating machine part (not shown). The spindle 59 is rigidly secured to the rotatable shaft 52 by a clamping element 60. Thus, any angular movement of the spindle 59 is transferred to the shaft 52 and thus the graduated plate 53.

The apparatus further includes a casing 61 which is rigidly secured to a second machine part 63 by screw 62. Secured to the casing 61, and enclosing the graduated plate 53 and scanning unit 54 is a cover 64, which is fastened to a casing 61 by means of screws 65. Located between the casing 61 and cover 64, in a slot 88 in the casing 61, is a sealing element 85 which prevents the penetration of dirt and impurities into the apparatus.

The cover 64 includes an aperture 67 through which a cable cord 66 extends. The cable cord 66 connects the scanning unit 54 with an external evaluation system (not shown).

To secure the scanning unit 54 so that it will not twist in response to the angular acceleration, the rotatable shaft 52, a coupling unit 68 is provided. The coupling unit 68 is a bellows-type coupling unit. The bellows-type coupling unit 68 is preferably soldered to the carrier 69 of the scanning unit 54 and to the casing 61 at an engagement surface 70. The bellows coupling 68 is arranged concentrically to the turnable hollow shaft 52 and allows translational movements perpendicular to one another between the scanning unit 54 and the casing 61, in a plane perpendicular to the axis of the rotatable shaft 52 in response to eccentricities of shaft and angular alignment errors without impairing the measuring accuracy of the apparatus.

It should be understood that various changes and modifications to the preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

I claim:

1. In an apparatus for measuring the angular position of a first and second object rotatable relative to one another of the type in which a graduated plate is attached to a rotatable shaft, and the angular displacement of the graduated plate is measured by a scanning unit, the improvement comprising:
   means for rigidly securing said rotatable shaft and graduated plate to the first object;
   a housing enclosing said graduated plate and scanning unit;
   means for rigidly securing said housing to the second object;
   means disposed within the housing for supporting said scanning unit on said rotatable shaft; and
   coupling means disposed within the housing for securing said scanning unit to said housing to prevent said scanning unit from twisting with respect to said housing;
   said housing cooperating with the second object to protect the graduated plate, the scanning unit, the shaft, and the coupling means from external forces by conducting external forces to the second object.

2. The apparatus of claim 1 wherein said coupling means includes two sets of parallel guides located perpendicular to one another.

3. The apparatus of claim 1 wherein:
   said coupling means includes two sets of parallel springs located perpendicular to one another;
   one of said sets of springs having a circular cross-section; and
   said second set of springs having a rectangular cross-section.

4. The apparatus of claim 1 wherein said coupling means includes a pair of diaphragm springs.

5. The apparatus of claim 1 wherein said coupling means includes a bellows-type coupling.

6. The apparatus of claim 1 wherein said means for supporting said scanning unit includes a carrier journaled on said shaft.

7. The apparatus of claim 6 wherein said coupling means includes:
   an intermediate ring located concentric to said shaft;
   a pair of leaf springs, each of said leaf springs being secured at one end to said carrier and at another end to said intermediate ring so that said leaf springs are located parallel to each other; and two spring wires, each of said spring wires being secured at one end to said intermediate ring and at a second end to said housing so that said spring wires are located parallel to each other.

8. The apparatus of claim 7 wherein said leaf springs and said wire springs are located in a plane perpendicular to the axis of said rotatable shaft.

9. An apparatus for measuring the angular position of a first object rotatable relative to a second object, said apparatus comprising:
a rotatable shaft;
a graduated plate attached to said rotatable shaft;
said rotatable shaft and graduated plate being rigidly secured to the first object;
a scanning unit for scanning said graduated plate;
a carrier journaled on said shaft for supporting said scanning unit;
a housing enclosing said scanning unit, said carrier and said graduated plate, said housing being rigidly secured to the second object; and
coupling means disposed within the housing for securing said scanning unit to said housing to prevent said scanning unit from twisting with respect to said housing;
said housing cooperating with the second object to protect the rotatable shaft, the graduated plate, the scanning unit, the carrier, and the coupling means for external forces by conducting external forces to the second object.

10. The apparatus of claim 9 wherein said coupling means includes two sets of parallel guides located perpendicular to one another.

11. The apparatus of claim 9 wherein:
said coupling means includes two sets of parallel springs located perpendicular to one another;
one of said sets of springs having a circular cross-section; and
said second set of springs having a rectangular cross-section.

12. The apparatus of claim 9 wherein said coupling means includes a pair of diaphragm springs.

13. The apparatus of claim 9 wherein said coupling means includes a bellows-type coupling.

14. The apparatus of claim 9 including elastic sealing means for sealing said housing against said rotatable shaft.

15. The apparatus of claim 12 including:
an intermediate ring located concentric to said shaft and including an upper and a lower ring;
one of said diaphragm springs being attached to said carrier and said upper rim of said intermediate ring;
a second of said diaphragm springs being attached to said housing and said lower rim of said intermediate ring; and
said diaphragm springs are attached so that they are located in planes parallel to one another.

16. The apparatus of claim 15 wherein:
said first diaphragm spring is attached to said carrier ring at two diametrically opposed positions and to said upper rim of said intermediate ring at two positions offset from said two diametrically opposed positions by about 90°; and
said second diaphragm spring is attached to said lower rim of said intermediate ring at two diametrically opposed positions and to said housing at two positions offset from said positions on said lower rim by about 90°.

17. An apparatus for measuring the angular position of two objects rotatable relative to one another comprising:
a rotatable shaft rigidly secured to a first rotatable object;
a graduated plate secured to said rotatable shaft;
a scanning unit for measuring the angular displacement of said graduated plate said scanning unit being attached to a carrier ring journaled on said shaft;
a housing for enclosing said graduated plate and said scanning unit, said housing being rigidly secured to said second rotatable object, said housing including a top and bottom cover and elastic sealing means located between said covers and said rotatable shaft for preventing contaminants from entering said casing and allowing relative movement between said shaft and said housing; and
coupling means, disposed in said housing, for securing said scanning unit to said housing to prevent, said scanning unit from twisting with respect to said housing;
said housing cooperating with the second object to protect the rotatable shaft, the graduated plate, the scanning unit, and the coupling means from external forces by conducting external forces to the second object.

18. The apparatus of claim 17 wherein said coupling means includes:
two sets of parallel guides located perpendicular to one another.

19. The apparatus of claim 17 wherein said coupling means includes:
an intermediate ring;
a set of parallel leaf springs; and
a set of parallel wire springs.

20. The apparatus of claim 17 wherein said coupling means includes:
an intermediate ring; and
a pair of diaphragm springs, each mounted between the intermediate ring and a respective one of the scanning unit and the housing.

21. The apparatus of claim 17 wherein said coupling means includes a bellows-type coupling.

22. The apparatus of claim 19 wherein:
each of said leaf springs is connected at one end to said intermediate ring and at another end to said carrier ring; and
each of said wire springs is connected at one end to said intermediate ring and at another end to said housing.

23. The apparatus of claim 22 wherein said scanning unit carrier is journaled on said shaft by a ball bearing.

* * * * *

UNITED STATES PATENT AND TRADEMARK OFFICE
CERTIFICATE OF CORRECTION

PATENT NO. : 4,495,700

DATED : January 29, 1985

INVENTOR(S) : Alfons Ernst

It is certified that error appears in the above-identified patent and that said Letters Patent is hereby corrected as shown below:

IN THE CLAIMS

In claim 9 (column 7, line 29), please delete "for" and substitute therefor --from--;

Signed and Sealed this

Fifth Day of August 1986

[SEAL]

Attest:

DONALD J. QUIGG

Attesting Officer

Commissioner of Patents and Trademarks